United States Patent [19]

Karbowski

[11] 4,348,639

[45] Sep. 7, 1982

[54] TRANSMITTER-RECEIVER LOOP BURIED METAL OBJECT LOCATOR WITH SWITCH CONTROLLED REFERENCE VOLTAGE

[75] Inventor: James P. Karbowski, Philomath, Oreg.

[73] Assignee: Triple Dee Electronics Inc., Lebanon, Oreg.

[21] Appl. No.: 40,399

[22] Filed: May 18, 1979

[51] Int. Cl.³ .......................... G01V 3/11; G01V 3/165
[52] U.S. Cl. .................................................... 324/329
[58] Field of Search ............... 324/326, 329, 334, 233

[56] References Cited

U.S. PATENT DOCUMENTS

| | | | |
|---|---|---|---|
| 2,160,356 | 5/1939 | Fore et al. | 324/329 |
| 2,807,777 | 9/1957 | Doll | 324/329 |
| 3,471,772 | 10/1969 | Smith | 324/329 |
| 3,478,263 | 11/1969 | Hentschel | 324/233 |
| 3,614,600 | 10/1971 | Ronka | 324/334 |
| 3,676,772 | 7/1972 | Lee | 324/233 |
| 3,826,973 | 7/1974 | Pflaum | 324/329 |
| 4,016,486 | 4/1977 | Pecori | 324/326 |
| 4,024,468 | 5/1977 | Hirschi . | |
| 4,030,026 | 6/1977 | Payne . | |
| 4,070,612 | 1/1978 | McNeill et al. | 324/334 |
| 4,095,180 | 6/1978 | Brown | 324/233 |
| 4,110,679 | 8/1978 | Payne . | |

FOREIGN PATENT DOCUMENTS

| | | | |
|---|---|---|---|
| 212606 | 1/1956 | Australia | 324/329 |
| 2524975 | 12/1976 | Fed. Rep. of Germany | 324/329 |
| 1299183 | 12/1972 | United Kingdom | 324/329 |

OTHER PUBLICATIONS

Metrotech Corp. publication, "Underground Locator Products", Pipe and Cable Locator Model 480.

*Primary Examiner*—Gerard R. Strecker
*Attorney, Agent, or Firm*—Stevens, Davis, Miller & Mosher

[57] ABSTRACT

Apparatus and method are provided for locating the position, depth, and run of a longitudinal metal object. Specifically, apparatus and method are provided for the tracing of a longitudinal subterranean metal object such as pipes or cables. The apparatus is capable of energizing a subterranean metal object and thereafter detecting the electromagnetic field produced by the metal object with a search loop. The magnitude of a current produced in the search loop is precisely measured whereby the location of the pipe or cable is precisely established. Circuitry is provided to provide high noise immunity to the detection of electromagnetic fields not originating with the metal object. Means are provided to maintain the system sensitivity without relying upon tedious mechanical adjustments.

8 Claims, 5 Drawing Figures

U.S. Patent  Sep. 7, 1982  Sheet 1 of 2  4,348,639

TRANSMITTER-RECEIVER LOOP BURIED METAL OBJECT LOCATOR WITH SWITCH CONTROLLED REFERENCE VOLTAGE

BACKGROUND OF THE INVENTION

This invention relates to the pipe/cable locator-tracer art. In particular, a device for locating the position of a subterranean longitudinal metal object such as a pipe or cable is provided.

It has been known in the art to locate subterranean pipes or cables by first energizing these objects with a current which can be detected above ground with a search loop and appropriate receiver. Often, a transmitter is physically coupled to the receiver and the combination is used to induce a current in the object and detect the resulting field produced by the object. One of the problems encountered in the prior art in searching for subterranean objects according to these techniques is that the soil itself, particularly when mineralized, can distort the measurements obtained by a search loop and receiver operated above ground in connection with a transmitter. In particular, the signal received by the search loop can change with changes in height of the search loop above ground when there are mineralized conditions encountered.

Energizing the subterranean pipe by providing a transmitter with a large transmit coil above ground in the vicinity of a pipe has been known. The pipe below ground will provide a field which the search coil, located relatively close to the transmit coil and fixed in a preferred relationship with the transmit coil will receive. However, directly induced fields from the transmit coil which did not originate with the energized pipe will also be sensed by the search coil unless there are tedious mechanical adjustments made so that the search coil is maintained in a fixed relationship with the transmit coil. This solves the problem of direct coupling from transmitter coil to search coil, however, changes in the permeability of the soil which permits indirect coupling of the magnetic field associated with the transmitter coil with the search coil are not effectively dealt with by this technique. This effect results in a "ground" signal induced in the search loop in addition to a signal resulting from the energization of the pipe increasing the difficulty of detecting the pipe.

The sensitivity of these prior art devices is limited by the mechanical adjustments which are required to maintain the coils in a non-coupling relationship. Finer mechanical adjustments permit more sensitivity. Therefore, the operator of the locator is preoccupied with the maintaining of these adjustments.

In view of the foregoing difficulties, the present invention has been designed.

SUMMARY OF THE INVENTION

It is a principal object of this invention to provide an apparatus and method for detecting the presence of longitudinal metal objects below the surface of the ground.

It is another object of the invention to accurately trace and determine the depth of a buried longitudinal metallic object.

These and other objects of the invention are provided by an apparatus which induces an alternating electrical current of a predetermined frequency and phase in a buried metal pipe or cable. The metal pipe or cable produces in response to this electrical current a varying magnetic field which may be detected to determine the location of the source of the field. Detection of the field is accomplished by locating a rectangular loop in a coupling relationship with the magnetic field whereby the resulting loop current is monitored by an apparatus in accordance with the invention.

In one embodiment of the invention, the phase of the loop current is compared with phase of the current induced in the metal object. When a particular phase relationship exists, the current induced in the rectangular loop from the electromagnetic field may be distinguished from currents induced in the loop from other sources of electromagnetic fields.

Accurate positioning of the rectangular loop with respect to the subterranean metal object is achieved by comparing the magnitude of the loop current having the desired phase relationship with a reference signal. As the magnitude of the detected current increases, the magnitude of the reference signal may be increased by the operator until a predetermined difference between the reference signal and the loop current exists. The process of monitoring this predetermined difference while constantly altering the magnitude of the reference signal permits an accurate positioning of the rectangular loop with respect to the subterranean object. As an alternative to phase detecting the loop current, peak detecting the current in the loop may be accomplished and the result compared with a variable reference signal.

This embodiment contemplates that the location of the pipe/cable be determined by fixing a transmitter with an inducing coil for inducing a current in the subterranean pipe/cable to a receiver with an associated rectangular search loop. The transmitter inducing coil comprises a rectangular loop having a plane perpendicular to the rectangular search loop connected to the receiver. The receiver continually monitors the current in the loop having the desired phase relationship. As this loop current increases, the operator is permitted to adjust the magnitude of the reference signal while monitoring the relative difference between the reference signal and the loop current. This control, which the inventor refers to as a "thumbset control" permits operation of the receiver at a desired sensitivity without making tedious mechanical adjustments, whereby an effective "null" is achieved by altering the magnitude of the reference signal.

The invention is characterized by the fact that as well as measuring accurately the location of a subterranean longitudinal object the depth of the object may be determined. Once the location of a longitudinal metal object is located, the depth of the object may be conveniently measured. The transmitter and its associated rectangular loop may be separated from the receiver and positioned so as to continually energize the subterranean longitudinal metal object. The axis of the receiver rectangular loop is located directly over and coincident with the run of the metal object. The rectangular loop is maintained level and moved perpendicularly away from the run of the longitudinal metal object until a peak current is induced in the rectangular loop. The distance between the axis of the rectangular loop and the run of the longitudinal object represents the depth of the object.

DESCRIPTION OF THE PREFERRED EMBODIMENT

Figure 1:
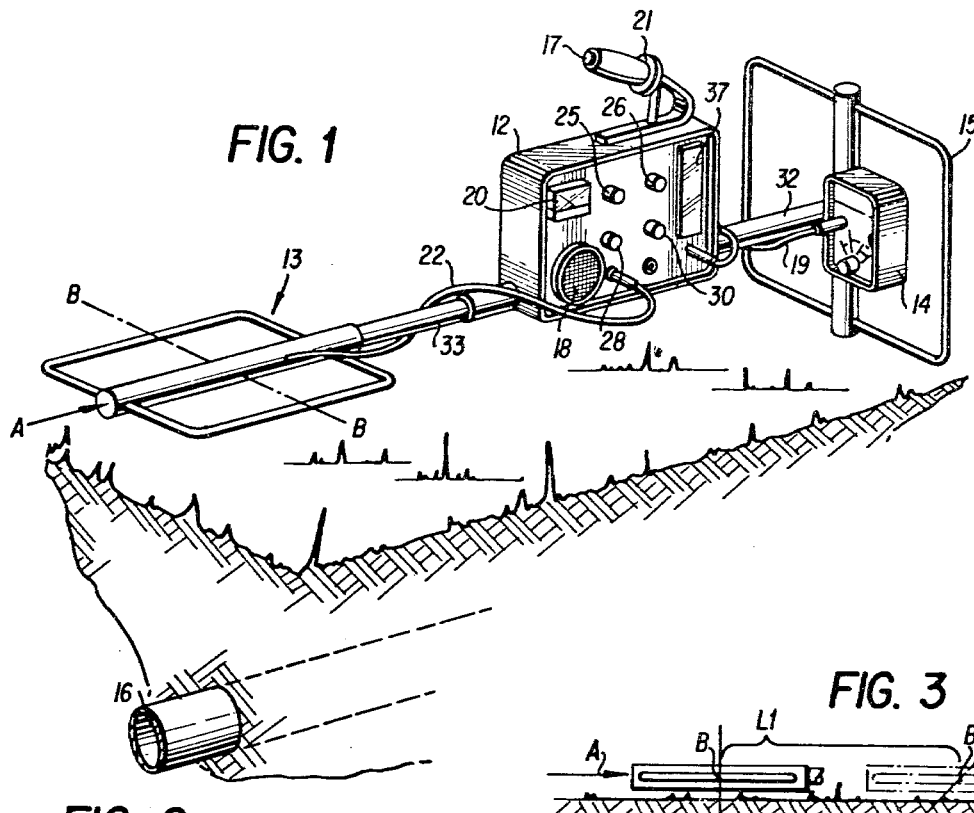
FIG. 1 illustrates a configuration of a preferred embodiment of the present invention.

Referring now to FIG. 1, there is shown an apparatus for carrying out the invention. The apparatus shown is capable of inducing a current in a subterranean metal pipe 16. The resulting current in the pipe 16 produces a field which is detected by the apparatus.

Inducing the current into the subterranean pipe 16 is accomplished by a transmitter 14 which provides an alternating current to the rectangular loop 15. The rectangular loop is positioned in a vertical plane and the field resulting from the rectangular loop 15 is sufficient to induce a current in pipe 16.

The transmitter 14 is connected by a supporting member 32 to a receiver/control unit 12. The receiver/control unit 12 has a search loop 13 connected thereto which also comprises a rectangular loop supported by supporting member 33 in a perpendicular relationship to the transmit coil 15. Transmitter 14 is connected to receiver/control unit 12 by a cable 19. Cable 19 is used to supply both battery power to transmitter 14 as well as provide a reference signal from transmitter 14 to receiver/control unit 12. The operator of the combination of transmitter 14, receiver/control unit 12, rectangular loop 15, and search loop 13 grasps the instrument by the handle 21 provided and walks over the terrain in search of a subterranean metal pipe 16. In normal operation, the detection of a current in the search loop 13 will provide an increasing level of the audible signal from a speaker 18 on the receiver/control unit 12. The receiver/control unit 12 is also equipped with a meter 20 which will give a visual indication of the level of a current induced into the search loop 13. Maximum signal is detected when the main axis A of the detector is perpendicular to the buried pipe.

The receiver/control unit 12 is also equipped with a ground signal reject feature which provides discrimination from currents which are produced in search loop 13 from sources other than the electromagnetic field associated with pipe 16. In particular, control 30 is used to desensitize the receiver to the magnetic field which would normally be coupled from the rectangular loop 15 through the soil to the search loop 13. The control 30 takes advantage of the 90° phase relationship existing between the currents which result from the field produced by the pipe and those resulting from the ground signal. The receiver/control unit 12 is also provided with a sensitivity control 28 which allows the operator to vary the amplification given to currents which are present in the search loop 13.

When an indication is given by speaker 18 or meter 20, that a current is being induced in search loop 13 as a result of the presence of a subterranean pipe 16, the search loop 13 is positioned in a direction which increases the level indicated by meter 20. The operator then operates a thumbset control 17 located in the handle of the receiver unit until the audible signal coming from speaker 18 is diminished and the indication provided by meter 20 is reduced. Further searching with the combination transmitter receive unit will provide an increase in the signal level registered on meter 20 and the sound emitting from speaker 18 further refining the location of the metal pipe 16. The sensitivity of the instrument is maintained by the repeated actuating of thumbset control 17 to once again lower the indication on meter 20 and the level of audible sound from speaker 18. This procedure prevents saturation of the internal comparator permitting an improved resolution of the pipe 16 location. When the peak level is finally obtained, the pipe 16 is determined to be perpendicular to the main axis of the rectangular loop 16. Rotating the receiver/control unit 12-transmitter 14 combination will provide a minimum signal when the axis A of the combination is coincident with the pipe run, and a maximum signal is detected when the rectangular loop 15 lies in a plane coincident with the pipe 16 run.

When the location of the pipe is generally found, the transmitter unit 14 and loop 15 may be separated from the receiver/control unit 12 and placed in a position which is known to energize a current in the subterranean pipe 16. With the units thus separated, it is possible to trace the run of the underground pipe 16 with the receiver/control unit 12 and search loop 13. Tracing is accomplished by holding the receiver vertical with respect to the known position of the pipe previously located. With the search loop 13 vertical with respect to the ground, a peak indication will be registered when the plane of the search loop 13 is in line with the pipe 16. Moving the instrument maintaining its vertical orientation and the peak signal indication will provide an accurate trace of the pipe 16. In the trace mode, sensitivity control 28 may be operated to increase sensitivity facilitating tracing of weak signals.

Figure 3:
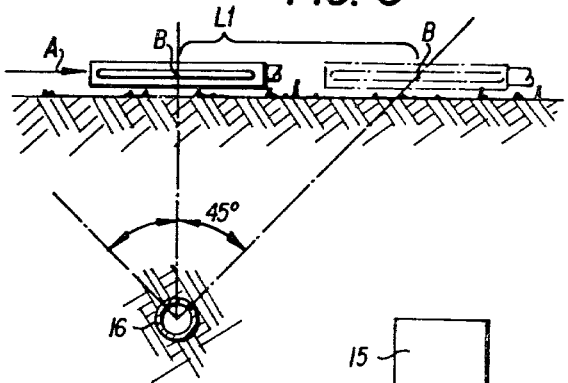
FIG. 3 illustrates the method for determining the depth of a metal object.

An advantage of this embodiment of the invention may be appreciated by reference to FIG. 3. FIG. 3 indicates a method for determining the depth of the subterranean pipe with the receiver/control unit 12 and search loop 13. With the transmitter energizing the pipe 16, the search loop 13 is accurately positioned in a level horizontal plane over the pipe until the minimum signal level is achieved which indicates the pipe to be below the center of the search loop 13 and coincident with the minor axis B of the search loop. This procedure is usually carried out with the transmitter unit 14 and loop 15 separated from the receiver/control unit 12 and located approximately 20 to 30 feet from the receiver/control unit 12. Next, the receiver control unit 12 and search loop 13 are moved in a direction perpendicular to the previously determined run of the located pipe but level until a maximum current level is induced in the search loop 13 as determined by the meter 20, and a maximum audible signal is provided by speaker 18. The determination of this point of maximum audible signal may involve several "thumbset" operations to precisely pinpoint its location. The peak signal thus detected, the distance L between the position of the minor axis B of the search loop 13 from the pipe location substantially corresponds to the depth of the buried pipe 16. A level may be conveniently provided on the receiver/control unit 12 to aid this procedure.

Other features of the preferred embodiment of this invention include a control 25 which permits the check of batteries in both the transmitter 14 and receive/control unit 12. Also, a control 26 is provided for adjusting the threshold level of the audible tone which is produced by speaker 18. The relative position of the switch 25 determines whether meter 20 is monitoring the battery voltage of transmitter 14, receiver/control unit 12. A battery compartment 37 is provided whereby batteries for operation the receiver/control unit 12 are located.

Figure 2:
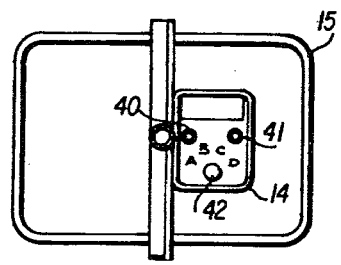
FIG. 2 illustrates the configuration of a transmitter and associated transmit loop used in the embodiment of FIG. 1.

Referring now to FIG. 2, there is shown the transmitter unit 14 in association with the loop 15. The transmitter unit 14 includes a switch 42 which has positions A, B, C and D associated therewith. Position A of switch 42 is selected when the unit is coupled with the receiver/control unit 12 as shown in FIG. 1 energizes the transmitter 14 from the receiver/control unit 12 battery and the search commences for a subterranean metal object. Position B is used when the transmitter and transmit loop 15 are separated from the receiver and the transmit loop 15 is to remain energized. The transmitter is thereafter operated from internal batteries. Position C corresponds to a feature of the present transmitter whereby if one end of a metal pipe or cable to be traced is known, a cable from jack 41 will connect and energize the current directly to the subterranean pipe, and loop 15 is disabled. Position D of switch 42 is also selected for directly energizing the subterranean pipe 16 with a physical connection. The difference between positions C and D relates merely to the nature of the output circuit for coupling the transmit signal to the pipe 16. Jack 41 will provide a signal from a voltage source or a current source depending upon whether position C or D is selected. Jack 40 is used to connect by means of cable 19 the receiver/control unit 12 with the transmitter unit 14 when the units are used together to locate a subterranean pipe as in FIG. 1.

Figure 4:
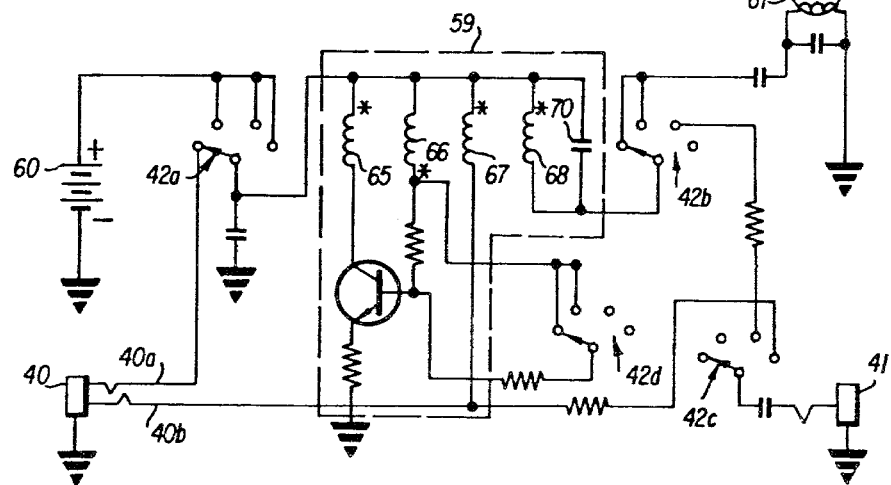
FIG. 4 is a schematic drawing showing one example of a circuit used to energize a transmit loop.

Referring now to FIG. 4, the detailed circuitry for transmitter 14 is illustrated for energizing the loop 15.

The transmitter 14 includes within it a battery 60 which is used to energize the transmitter 14 when the transmitter 14 is separated from the receiver/control unit 12. FIG. 4 illustrates the connection of the circuitry with respect to the search mode where both transmitter unit 14 and receiver unit 12 are connected together. In this mode, the battery 60 within the transmitter unit is not operated as power is delivered from the receiver unit through jack 40, connection 40a to energize the circuit of FIG. 4. FIG. 4 preferably includes an oscillator 59 for providing oscillations at approximately 110 KHZ. These oscillations are coupled through switch 42b to either the search loop through a transformer 61, or to jack 41 where the signal produced may be directly coupled through a cable to a located pipe end. The oscillator 59 shown is a standard transistor oscillator having inductors 65, 66, 67 and 68 wound on a common core and connected according to the polarity shown in the drawing. Capacitor 70 is selected to resonate with inductor 68 at the proper frequency. Inductor 67 provides for a reference signal coupled to jack 40 through contact 40b. As will be seen from the description of FIG. 5, this jack 40 provides battery voltage on terminal 40a when switch 42 is selectively positioned, as well as a reference signal for the receiver of FIG. 5.

Figure 5:
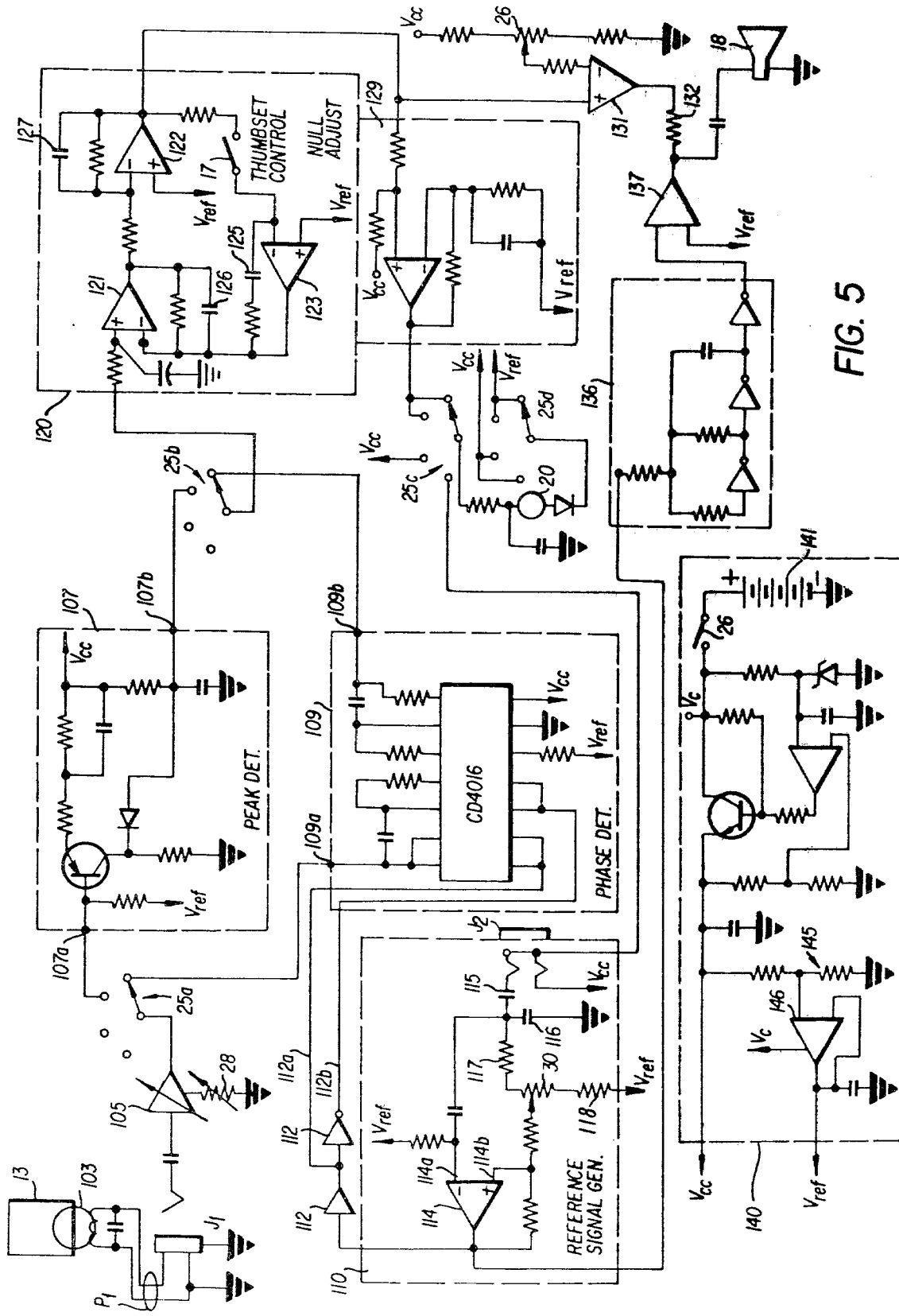
FIG. 5 is a schematic drawing showing one example of a circuit used to detect the presence of a current in a search loop.

Referring now to FIG. 5, there is shown in detail specific circuitry for implementing the receiver/control unit 12 of FIG. 1.

The search loop 13 is shown coupled by means of transformer core 103 to a primary winding also located thereon and the primary winding is connected to cable 22. Cable 22 terminates in a plug P1 connecting with the control unit 12 of FIG. 1.

The control unit 12 also contains a jack J1 which receives a plug P1 on cable 22. Connected to the jack J1 is a variable gain amplifier 105 having a control 28 which is accessible on the receiver/control unit 12. The amplifier 105 is shown capacitively coupled to the cable 22. The output terminal of amplifier 105 is connected to the selector arm of a section of mode select switch 25. The mode select switch 25 is a multi-section switch having four ganged switching poles which are used to simultaneously switch different parts of the receiver circuitry.

Section A of switch 25 connects the output of the amplifier 105 to either a peak detector 107 or to the input 109a of a phase detector 109. In the embodiment shown, the output of the amplifier 105 is connected to the input of the phase detector 109. This corresponds to the circumstance where both the transmitter and loop 14, 15 are operatively fixed to the receiver/control unit 12 and search loop 13 as shown in FIG. 1. This switch position will provide for detection of currents which are in search coil 13 as a result of the field produced by subterranean pipe 16 of FIG. 1. The phase detector provides an output signal only when the current in search loop 13 has a predetermined phase relationship with the field generated by the transmit loop 15. By limiting the detection to this circumstance, it is possible to discriminate against extraneous currents induced in search coil 13 which do not result from the field produced by the subterranean pipe 16. This provides a measure of noise reduction in the detection of the search coil 13 current.

The phase detector 109 has reference inputs 112b and 112a which provide a signal for phase comparison with the input signal from amplifier 105. The two reference inputs 112a and 112b are driven by complementary amplifier 112. Phase detector 109 may consist of a QUAD analog switch having a designation of CD4016 known to those skilled in the art.

The reference signal for phase detector 109 originates from the transmitter through a jack J2. The jack J2 has one conductor coupled through a capacitor 115 to the connection of a resistor 117 and another capacitor 116. Potentiometer 30, having one end connected to the remaining end of the resistor 117 and the other end connected to resistor 118, provides a signal having a variable amplitude relationship with the signal at the junction of resistor 117 and capacitor 115. Differential amplifier 114 combines the variable amplitude signal on the noninverting input 114b with the constant amplitude signal on inverting input 114a.

The two a.c. signals are vectorally added by differential amplifier 114 to produce a third a.c. signal having a phase and amplitude which is related to the input signals phase and amplitude. The result is that the output of amplifier 114 can provide a signal having the frequency proportional to the transmitter signal supplied through J2, but having a phase which may be selected.

The reference signal generator 110 which provides the reference signal for phase detector 109 is used to null out any indication of currents detected in search loop 13 which do not result from the field generated by subterranean pipe 16. These extraneously induced currents result from a direct coupling from the transmitter loop coil 15 through the soil and then coupled into the search loop 13. With the receiver/control unit 12 held away from a subterranean pipe, the control 30 is adjusted until the meter 20 or speaker 18 indicates that no signal is being received. Control 30 is adjusted so that raising or lowering the complete assembly of control unit/receiver 12 and transmitter 14 produces no change in the audible signal from speaker 18 or movement in meter 20. This, in effect, varies the reference signal provided on phase detector inputs 112a and 112b until they have a 90° phase relationship with the ground signal appearing on input 109a of the phase detector. Currents induced into the search loop 13 from the electromagnetic field produced by the energized pipe have a phase relationship which is different from those produced by other sources of electromagnetic energy and will, therefore, appear as an output voltage at the phase detector ouput 109b.

With the phase of the reference signal generator selected as described above, the output 109b of the phase detector 109 is connected to the terminal of switch 25b. With the switch 25 set in the locate mode as shown, the input to the null adjusting circuit 120 is provided from phase detector 109. As the search loop 13 receives an induced current from the field generated by a subterranean pipe 16, the input to differential amplifier 121 will begin to rise. Differential amplifier 121 provides an output to the inverting input of a second differential amplifier. Roll-off capacitors 126 and 127 are provided across the feedback resistors associated with these amplifiers to roll-off the output response above a predetermined frequency. The operator, when in the vicinity of a pipe will note an increased reading on the meter 20 and the audio signal provided by speaker 18 will begin to rise in intensity. As the intensity increases from speaker 18, it will be possible to more critically locate the position of subterranean pipe 16 by operation of the thumbset control 17. When the meter 20, driven by meter drive circuit 129, provides an off-scale indication, and the speaker 18 provides a very loud signal, the thumbset control 17 comprising a momentary switch is activated whereby the voltage to the inverting input of differential amplifier 121 will rise tending to reduce the signal level at the output of differential amplifier 122. When the output level of differential amplifier 122 is reduced to a predetermined level, the operator can remove his finger from the thumbset control 17 and the meter 20 will be on scale as well as the audible signal from speaker 18 be reduced to a lower level. Capacitor 125 will maintain the established voltage on the inverting input of differential amplifier 121 until the thumbset control is again activated. The operator may then bring the search loop 13 into proximity with the subterranean pipe 16 by once again moving the search loop 13 until the signal strength as recorded on meter 20 or audible signal from speaker 18 increases to a peak level.

The indication from differential amplifier 122 of the proximity of the subterranean pipe 16 is provided to the differential amplifier 131 where it is combined with a variable d.c. reference voltage provided by control 26. The output of differential amplifier 131 is summed through resistor 132 with the output from comparator 137. Comparator 137 has a first input connected to a reference voltage and a second input connected to the output of a multivibrator 136. Multivibrator 136 is further synchronized with the reference signal generator.

The operation of the circuit is such that a voltage threshold sufficient to initiate an audible signal supplied to speaker 18 may be varied by altering the d.c. voltage level provided by control 26. This d.c. voltage is summed with the square wave output provided by differential amplifier 137 which has a frequency of preferably 500 cycles per second. By adding the d.c. component the threshold voltage with no subterranean metal pipe present is established to prevent an audible signal from being produced by speaker 18 until a pipe or cable is detected.

The remaining power supply circuitry 140 is used to generate from a battery 141 the required voltages to run the circuit of FIG. 3. The switch 26 is an on-off switch coupled to potentiometer 26 in a manner known to those skilled in the art. The circuit 140 comprises a standard series regulator circuit which provides an operating voltage VCC for each of the circuit components as well as a reference voltage Vref which is divided from voltage VCC by voltage divider 145. Amplifier 146 having a gain of one is used to provide a low impedance output for Vref.

The circuitry according to FIG. 5 incorporates those features of FIG. 1 which permit monitoring the battery voltage of either the transmitter or receiver. By placing switch 25 in position A, the battery voltage from the transmitter supplied through jack J2 is monitored by the meter 20. In position B, switch 25 couples the meter 20 to the VCC voltage supplied by voltage supply circuit 140.

The circuitry of FIG. 5 is also provided as mentioned with a peak detector 107 which may permit an additional mode of operation for receiver/control unit 12. When the transmitter 14 and transmit loop 15 are separated, switch 25 is placed to position C which couples the output of amplifier 105 to the input 107a of peak detector 107. The output 107b of peak detector 107 is connected thereafter into the input of differential amplifier 121. With the unit separated, the transmitter unit 14 and search loop 13 are located near the previously located pipe, whereby a current is induced in the pipe providing a steady field which is detected by search loop 13 and control unit 12. With the peak detection mode selected, the pipe 16 may be accurately traced to provide an indication of the pipe run. Further, the depth of the pipe may be determined in this manner whereby the search loop 13 is accurately positioned for a minimum signal over subterranean pipe 16. By using the thumbset control 17, the search loop 13 is maintained level and is moved in a direction perpendicular to the pipe until a maximum reading is recorded. The maximum reading will be obtained by successive operation of the thumbset control and repositioning of the search loop 13 in order to locate the point of maximum current induction into the search loop 13. The distance between this second location and the first location corresponds to the depth of the subterranean pipe 16. If the run of the subterranean pipe is known, this procedure can be carried out by merely locating the minor axis B of the search loop 13 coincident with the pipe run and moving it away from the pipe run in a perpendicular direction until a maximum signal current induced in search loop 13 is detected. The distance between these two locations represent the depth of the pipe as in the previous procedure.

Selection of the peak detector 107 is also used when the ends of the subterranean pipe 16 are available for directly coupling to the transmitter 15 as previously discussed.

Thus, there is described with respect to one embodiment a new pipe locator and trace unit which may be used to determine the position, depth, and the run of a subterranean longitudinal metal object. The device achieves a maximum sensitivity without saturation which may be varied for precise measurements, as well as providing for rejection of extraneous signals which may be induced into the search loop 13. Those skilled in the art will recognize other embodiments of the invention, more particularly described by the claims which follow.

What is claimed is:

1. An electronic subterranean longitudinal metal object locator comprising:
    (a) first and second closed rectangular loops, said first loop being oriented in a vertical plane and said second loop being oriented in a horizontal plane perpendicular to said first loop and spaced apart therefrom;
    (b) means for energizing said first loop with an alternating electrical current whereby a varying electromagnetic field is produced;
    (c) means for positioning said first loop in a plane perpendicular to said longitudinal metal object and said second loop in a plane parallel thereto, whereby a current is produced in said metal object from said first loop which produces a varying electromagnetic field for inducing a receive current in said second loop the magnitude of said received current being controlled by the relative position of said loops with respect to said metal object;
    (d) an amplifier for providing a voltage proportional to a current induced in said second loop;
    (e) a phase detector having a first input for receiving a voltage from said amplifier and a second input coupled to a source of a phase reference signal, said phase reference signal desensitizing said phase detector to ground signals;
    (f) a comparator for providing an output voltage proportional to the difference between a reference voltage and the output voltage provided by said phase detector, said comparator output voltage being proportional to said received current;
    (g) means for indicating the relative output voltage of said comparator, whereby changes in the relative level of said received current may be monitored; and
    (h) means for manually varying the level of said reference voltage to alter said comparator output voltage in response to monitored increases in the magnitude of the received current in said second loop, said means including a switch connected to receive said comparator output voltage, said means providing a voltage related to said received current for restoring said comparator output voltage to a predetermined level in response to a momentary closure of said switch, whereby the relative magnitude of said current is monitored for accurately positioning said second loop with respect to said longitudinal metal object, the position of said second loop determining the position of said metal object.

2. The apparatus of claim 1, further comprising means for varying the phase of said reference signal.

3. The apparatus of claim 1, wherein said means for indicating provides an audible acoustic signal having a magnitude proportional to the output voltage of said comparator.

4. The apparatus of claim 2, wherein said reference signal has a frequency substantially equal to the frequency of said alternating electric signal.

5. A receiver for detecting an electromagnetic field produced by a subterranean metal object carrying an alternating current comprising:
    (a) a rectangular closed loop for producing a signal current in response to said electromagnetic field;
    (b) an amplifier operatively coupled to said loop for producing an output signal in response to said signal current;
    (c) phase detector for providing a voltage having an amplitude proportional to the difference in phase between said amplifier output signal and a reference signal;
    (d) means for supplying a reference signal to said phase detector, said reference signal having a phase in fixed relationship with the phase of said alternating current;
    (e) a comparator means for providing an output voltage proportional to the difference between said phase detector output voltage and a reference voltage;
    (f) a switch;
    (g) a manually variable reference voltage generator connected to supply said reference voltage to said comparator means for establishing the output voltage of said comparator means at a predetermined level for different levels of said voltage from said phase detector, said switch connecting said reference voltage generator to receive said comparator means output voltage whereby said reference voltage is established and maintained in response to a momentary closing of said switch; and
    (h) means for monitoring relative difference between said comparator output voltage and said predetermined level during positioning of said rectangular loop, whereby the optimum position of said loop for inducing a current in said rectangular loop may be precisely determined, said position being directly related to the location of said metal object.

6. An apparatus for determining the position of a longitudinal metallic object comprising:
    (a) means for inducing an alternating current in said object having a predetermined frequency whereby an alternating field is produced;
    (b) a rectangular loop for detecting said magnetic field, said loop producing a loop current having a frequency identical to said alternating current frequency;
    (c) amplifier means operatively coupled to said rectangular loop for producing a voltage in response to the loop current;
    (d) a peak detector connected to said amplifier for providing a voltage proportional to the peak voltage produced by said amplifier;
    (e) a comparator having an output for providing a voltage proportional to the difference between the peak detector output voltage and a reference voltage;
    (f) a switch;
    (g) a manually selectable reference voltage source operatively connected to said comparator, said voltage source providing an input voltage to said comparator in response to the momentary closure of said switch, said switch connected between said comparator output and said reference voltage source, whereby the output voltage of said comparator is selected to be a predetermined level; and (h) means for indicating changes in said comparator output voltage from said predetermined level, whereby an operator may reestablish said predetermined level as the difference between said peak detector output voltage and said reference voltage increases.

7. An apparatus for locating a buried metal object comprising:

first and second rectangular loops, said loops being spaced apart and lying in perpendicular planes;

means for energizing one of said loops with an alternating current;

means for detecting a current induced in the remaining of said loops, said means providing a signal proportional to the magnitude of said induced current;

means for comparing the phase of said induced current with the phase of said alternating current in said means for energizing, said means for comparing providing an output signal when said alternating current and said induced current have a predetermined phase relationship;

detector means for monitoring the level of a signal from said phase comparator comprising:

a differential amplifier having a first input connected to receive a signal from said means for comparing, a second input, and an output;

a momentary switch;

means for establishing a fixed voltage on said second input for reducing a voltage at said output to a predetermined level in response to a momentary closure of said switch, said switch connected between said means for establishing and said differential amplifier output;

means for maintaining said fixed voltage on said second input after said switch is opened;

means for providing an audible signal having a magnitude proportional to the magnitude of a singal from said first differential amplifier output;

whereby the proximity of said metal object is detected when said audible signal increases, and activating said momentary switch reestablishes a new fixed voltage decreasing said audible signal level permitting further positioning of said loops to increase said audible signal, further defining the location of said object.

8. An apparatus for locating a buried metal object comprising:

first and second rectangular loops, said loops being spaced apart and lying in perpendicular planes;

means for energizing said first loop with an alternating current;

means for detecting a signal induced in said second loop in response to an electromagnetic field generated by said metal object when in the presence of said first loop;

comparator means for detecting the difference between the magnitude of a signal induced in said second loop and the magnitude of a reference signal and providing at an output thereof a voltage indicating said difference;

means connected to said comparator means output for supplying a reference signal having a selectable magnitude to said comparator means, said means including a switch, said means providing in response to the momentary closure of said switch a reference signal voltage for establishing the comparator means output voltage to a predetermined level; and means for monitoring said difference during the positioning of said first and second loops whereby increases in said difference resulting from the proximity of said second loop with respect to said metal object may be reduced by successive increases in the magnitude of said reference signal until said loops are optimally positioned with respect to said metal object.

* * * * *